United States Patent
Vöhringer

(10) Patent No.: US 7,493,102 B2
(45) Date of Patent: Feb. 17, 2009

(54) METHOD FOR DETERMINING CHARGES IN REAL TIME FOR VALUE-ADDED SERVICES IN A TELECOMMUNICATION NETWORK

(75) Inventor: Gerrit Vöhringer, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 417 days.

(21) Appl. No.: 10/550,167

(22) PCT Filed: Mar. 18, 2004

(86) PCT No.: PCT/DE2004/000563

§ 371 (c)(1),
(2), (4) Date: Jul. 24, 2006

(87) PCT Pub. No.: WO2004/084563

PCT Pub. Date: Sep. 30, 2004

(65) Prior Publication Data

US 2006/0276169 A1    Dec. 7, 2006

(30) Foreign Application Priority Data

Mar. 20, 2003  (DE) .................... 103 12 049

(51) Int. Cl.
   *H04M 11/00*   (2006.01)
(52) U.S. Cl. ............... 455/408; 455/445; 455/406; 455/428; 370/353; 379/114.25; 379/114.03; 379/114.28; 379/201.05
(58) Field of Classification Search ............. 455/445, 455/406, 408, 402; 379/114.28, 221.08–221.12
See application file for complete search history.

(56) References Cited

U.S. PATENT DOCUMENTS

| 5,187,710 A | * | 2/1993 | Chau et al. ............... 370/524 |
| 5,432,845 A | | 7/1995 | Burd et al. |
| 6,760,417 B1 | * | 7/2004 | Wallenius ............... 379/114.28 |
| 2005/0136889 A1 | * | 6/2005 | Zackrisson et al. .......... 455/406 |

FOREIGN PATENT DOCUMENTS

| WO | WO 99/59348 | 11/1999 |
| WO | WO 01/26353 A1 | 4/2001 |

* cited by examiner

Primary Examiner—Rafael Pérez-Gutiérrez
Assistant Examiner—Issam Chakour
(74) Attorney, Agent, or Firm—The Maxham Firm

(57) ABSTRACT

A method for determining charges in real time for value-added services in a telecommunication network, having an intelligent network structure, in which a caller selects a value-added service by dialing an associated destination number. This destination number is intercepted in an intelligent network element of the telecommunication network and is converted into a special access number for the value-added service. A connection is established between the intelligent network element and the value-added service provider through the use of this destination number. The value-added service provider transmits the applicable rate for the use of the requested value-added service to the mobile telephone network operator in the form of a new destination number for the requested value-added service. The new destination number is evaluated in the intelligent network element and a connection is established between the caller and the value-added service with the new destination number at the stated rate.

20 Claims, 1 Drawing Sheet

METHOD FOR DETERMINING CHARGES IN REAL TIME FOR VALUE-ADDED SERVICES IN A TELECOMMUNICATION NETWORK

BACKGROUND OF THE INVENTION

1. Field of the Invention

The present invention relates to a method for determining charges in real time for value-added services in a telecommunication network.

2. Background

There are various methods for implementing value-added services in telecommunication networks. In telecommunication networks such as public switched telephone networks and mobile telephone networks, some value-added services are offered as services by the network operator. Common services include communication-specific services that facilitate or expand upon connections-oriented traffic. The best known examples of this type are ISDN (Integrated Services Digital Network) and GSM (Global System for Mobile Communications) features of the corresponding ETSI (European Telecommunications Standards Institute) recommendations including call diversion, call forwarding, callback on busy, call waiting, etc. These services are implemented and operated by the network operator in the telecommunication network (in public exchanges) and in the intelligent network control SCP (Service Control Point) and SMS (Service Management System). In addition, there are value-added services such as voicemail (answering machine), messaging, recorded information service, information service (weather, lottery numbers, news, or the like) that are offered by the network operator or by external value-added service providers. These can also include traffic information services. As a rule, this service category can only be accessed by network-specific customers when they dial corresponding telephone numbers; as a rule, the use of the service is linked to calling the value-added service provider and a corresponding fee is automatically charged via the telecommunication bill. Up to this point, it has not been possible to determine the charges in real time for the value-added service being used in the telecommunication network or to change the rate during a call to a value-added service provider.

WO01/26353A1 has disclosed a method for changing the taxation type of communication connections during a connection, in particular when using value-added services, in which a caller can select a value-added service by dialing an associated destination number and the destination number is intercepted in a network element of an intelligent network (IN) of the telecommunication network. In the intelligent network element, this destination number is converted into a special access number for the value-added service. This special access number is then used to establish a connection between the intelligent network element and the value-added service provider using the access number and is switched through to the caller. It is not possible to inform the caller about the rate for the connection or to determine charges in real time in the telecommunication network.

SUMMARY OF THE INVENTION

A purpose of the invention is to provide a method that permits a determination of charges in real time for value-added services by means of a telecommunication network.

An advantage of the invention lies in the fact that the network operator of the telecommunication network, and possibly the caller himself, is immediately informed of the applicable rate for the value-added service so that the network operator can charge for the service in real time. This is particularly advantageous if the call is to be accounted for via a so-called prepaid subscriber relationship. In this case, the fee for the value-added service can be debited directly from the prepaid account.

The method of the invention also advantageously permits a rate change during a call to a value-added service provider.

BRIEF DESCRIPTION OF THE DRAWING

The objects, advantages, and features of an embodiment of the invention will be more clearly perceived from the following detailed description, when read in conjunction with the accompanying drawing, wherein.

DETAILED DESCRIPTION OF THE PREFERRED EMBODIMENTS

Figure 1:
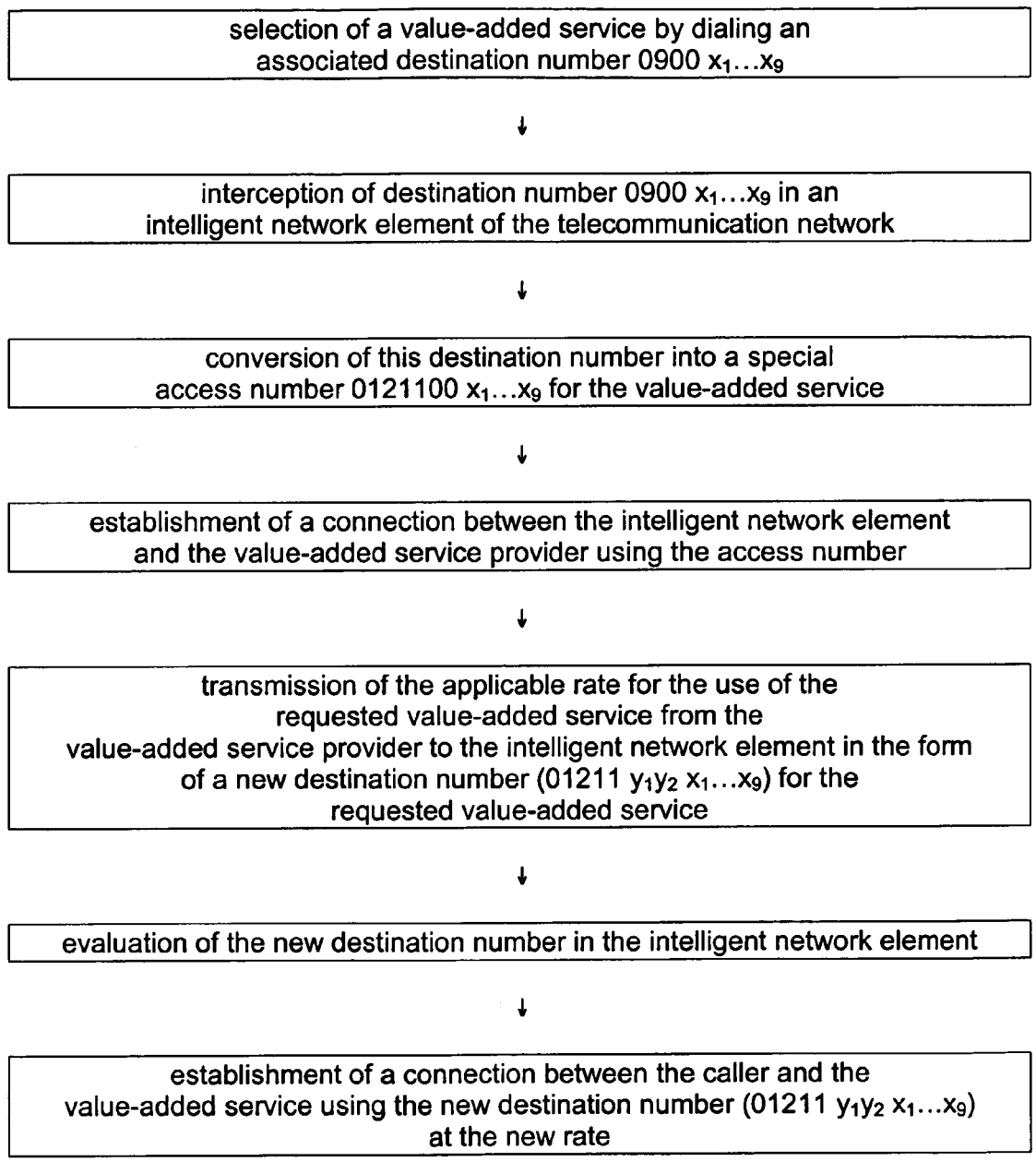
FIG. 1 is a flow chart showing general steps for executing the method of the invention.

In this exemplary embodiment, it is assumed that a subscriber of a mobile telephone network wishes to use his mobile telephone terminal to access a value-added service in a public switched telephone network. A value-added service is typically accessed by calling a special telephone number such as a so-called 0900 number. In the public switched telephone network, the rate is usually only determined upon establishment of the connection (offline billing). This does not make it possible for the network operator of the mobile telephone network to determine charges in real time.

According to the invention, the call to a 0900 number, for example, the telephone number 0900 $x_1 \ldots x_9$, where the telephone number component $x_1 \ldots x_9$ identifies the value-added service, is first intercepted in an intelligent network element of the mobile telephone network and converted into a predetermined access number, for example, 0121100 $x_1 \ldots x_9$ of the value-added service. This number is used to establish a connection between the intelligent network element and the value-added service provider, for example, a corresponding communications server. The call to this access number occurs without the caller's knowledge and at no charge. Depending on the identification of the value-added service by the existing number component $x_1 \ldots x_9$, the call recipient, that is, the value-added service provider, can determine the rate to be charged for the use of the service. This rate is transmitted by means of a signal from the value-added service provider to the intelligent network element of the mobile telephone network operator, in fact, through transmission of a new destination number for the requested value-added service. According to the invention, the user-to-user datum USR in the release message can be used to transmit the new destination number. The release message is a report that can be sent section-by-section in both directions of an intelligent network. This command terminates the user channel connection. The USR report can be sent via an end-to-end connection using the SCCP protocol.

The destination number transmitted has, for example, the format 01211 $y_1 y_2 x_1 \ldots x_9$, where the rate is encoded at the positions $y_1 y_2$. In this example, there are thus 99 possible rate levels. The release message is evaluated by the intelligent network element of the mobile telephone network operator and a connection is initiated between the original caller and this telephone number. The accounting data, the so-called billing record, now contains the new telephone number 01211 $y_1 y_2 x_1 \ldots x_9$ as the telephone number, which permits the accounting systems to allocate a rate. This telephone number can also be used to announce a price to the caller. If the value-added service provider then wishes to change the rate, it terminates the call and transmits a new destination number in the release message, for example, 01211 $z_1z_2 x_1 \ldots x_9$. The above-described process repeats, that is, the release message is evaluated by the intelligent network of the value-added service operator and a connection is initiated between the original caller and the new telephone number at the new rate, naturally. This method can be repeated any number of times.

The above-described steps are shown in the flow chart of FIG. 1.

The value-added service provider can, as needed, retain a context for the caller (CgPty) so that when entering the next price level, the caller is not treated as a new caller even though a new call is, in fact, physically being made.

The invention claimed is:

1. A method for determining charges in real time for value-added services in a telecommunication network, having an intelligent network structure, in which a caller selects a value-added service by dialing an associated destination number, 0900 $x_1 \ldots x_9$, comprising:

intercepting the destination number, 0900 $x_1 \ldots x_9$ in an intelligent network element of the telecommunication network and converting this destination number into a special access number, in the form of 0121100 $x_1 \ldots x_9$, for the value-added service;

establishing a connection between the intelligent network element and the value-added service provider through the use of the destination number;

transmitting the applicable rate for the use of the requested value-added service from the value-added service provider to the intelligent network element in the form of a new destination number, 01211 $y_1y_2 x_1 \ldots x_9$, for the requested value-added service, where the transmission of the new destination number occurs by means of a user-to-user datum (USR) in the release message;

evaluating the new destination number in the intelligent network element; and establishing a connection between the caller and the value-added service with the new destination number, in the form of 01211 $y_1y_2 x_1 \ldots x_9$, at the stated rate.

2. The method according to claim 1, wherein during the use of a value-added service, the value-added service provider can change the rate at any time by terminating the current connection and transmitting a new destination number, in the form of 01211 $z_1z_2 x_1 \ldots x_9$, in the release message, and using the new destination number, a connection is established between the caller and the new telephone number that is charged at the new rate.

3. The method according to claim 2, and further comprising identifying the value-added service in relation to a particular component, $x_1 \ldots x_9$, of the telephone number.

4. The method according to claim 3, and further comprising entering the new telephone number, 01211 $y_1y_2 x_1 \ldots x_9$; 01211 $z_1z_2 x_1 \ldots x_9$, into the billing record as the telephone number, thereby permitting the accounting systems to allocate a rate.

5. The method according to claim 3, and further comprising sending price information that corresponds to the rate determined to the caller's mobile telephone terminal.

6. The method according to claim 2, and further comprising identifying the value-added service in relation to a particular component, $x_1 \ldots x_9$, of the telephone number.

7. The method according to claim 6, and further comprising entering the new telephone number, 01211 $y_1y_2 x_1 \ldots x_9$; 01211 $z_1z_2 x_1 \ldots x_9$, into the billing record as the telephone number, thereby permitting the accounting systems to allocate a rate.

8. The method according to claim 2, and further comprising entering the new telephone number, 01211 $y_1y_2 x_1 \ldots x_9$; 01211 $z_1z_2 x_1 \ldots x_9$, into the billing record as the telephone number, thereby permitting the accounting systems to allocate a rate.

9. The method according to claim 2, and further comprising sending price information that corresponds to the rate determined to the caller's mobile telephone terminal.

10. The method according to claim 1, and further comprising identifying the value-added service in relation to a particular component, $x_1 \ldots x_9$, of the telephone number.

11. The method according to claim 10, and further comprising identifying the value-added service in relation to a particular component, $x_1 \ldots x_9$, of the telephone number.

12. The method according to claim 11, and further comprising entering the new telephone number, 01211 $y_1y_2 x_1 \ldots x_9$; 01211 $z_1z_2 x_1 \ldots x_9$, into the billing record as the telephone number, thereby permitting the accounting systems to allocate a rate.

13. The method according to claim 10, and further comprising entering the new telephone number, 01211 $y_1y_2 x_1 \ldots x_9$; 01211 $z_1z_2 x_1 \ldots x_9$, into the billing record as the telephone number, thereby permitting the accounting systems to allocate a rate.

14. The method according to claim 10, and further comprising sending price information that corresponds to the rate determined to the caller's mobile telephone terminal.

15. The method according to claim 1, and further comprising encoding the rate by means of a particular component, $y_1y_2$; $z_1z_2$, of the destination number.

16. The method according to claim 15, and further comprising entering the new telephone number, 01211 $y_1y_2 x_1 \ldots x_9$; 01211 $z_1z_2 x_1 \ldots x_9$, into the billing record as the telephone number, thereby permitting the accounting systems to allocate a rate.

17. The method according to claim 15, and further comprising sending price information that corresponds to the rate determined to the caller's mobile telephone terminal.

18. The method according to claim 1, and further comprising entering the new telephone number, 01211 $y_1y_2 x_1 \ldots x_9$; 01211 $z_1z_2 x_1 \ldots x_9$, into the billing record as the telephone number, thereby permitting the accounting systems to allocate a rate.

19. The method according to claim 18, and further comprising sending price information that corresponds to the rate determined to the caller's mobile telephone terminal.

20. The method according to claim 1, and further comprising sending price information that corresponds to the rate determined to the caller's mobile telephone terminal.

* * * * *